United States Patent
Gellert et al.

[11] Patent Number: 6,113,381
[45] Date of Patent: Sep. 5, 2000

[54] INJECTION MOLDING VALVE MEMBER ACTUATING MECHANISM

[75] Inventors: Jobst Ulrich Gellert, Georgetown; Simon Chu, Mississauga, both of Canada

[73] Assignee: Mold-Masters Limited, Georgetown, Canada

[21] Appl. No.: 09/257,141

[22] Filed: Feb. 22, 1999

[30] Foreign Application Priority Data

Feb. 8, 1999 [CA] Canada .................................. 2261367

[51] Int. Cl.⁷ .................................................. B29C 45/23
[52] U.S. Cl. ........................ 425/564; 264/328.9; 425/566
[58] Field of Search ................................. 425/562, 563, 425/564, 565, 566; 264/328.9

[56] References Cited

U.S. PATENT DOCUMENTS

| | | | |
|---|---|---|---|
| 4,212,627 | 7/1980 | Gellert | 425/564 |
| 4,330,258 | 5/1982 | Gellert | 425/564 |
| 5,238,378 | 8/1993 | Gellert | 425/564 |
| 5,984,661 | 11/1999 | Vorkoper | 425/562 |

Primary Examiner—Tim Heitbrink
Attorney, Agent, or Firm—Dalesman & Company

[57] ABSTRACT

Valve gated multi-cavity injection molding apparatus. A number of valve pins extend forwardly from a valve pin plate, each in alignment with a gate leading to a cavity in the mold. A pair of cam bars extend beside a pair of actuator bars attached to the valve pin plate. Rectangular slide blocks attached to each actuator bar fit in diagonal grooves in the adjacent cam bar, whereby longitudinal movement of the cam bars moves the valve pin plate and the valve pins forwardly and rearwardly. The cam bars are driven longitudinally by electromechanical or hydraulic actuating mechanism to simultaneously and accurately stop the valve pins in at least three different precise positions during each injection cycle.

11 Claims, 11 Drawing Sheets

INJECTION MOLDING VALVE MEMBER ACTUATING MECHANISM

BACKGROUND OF THE INVENTION

This invention relates generally to valve gated multi-cavity injection molding apparatus and more particularly to such apparatus including apparatus to simultaneously accurately drive all the valve pins between more than two positions.

Hydraulic mechanism for actuating injection molding valve pins is well known. However, in some applications such as those involving food, hydraulic fluid is not allowed in the mold. In these cases, pneumatic actuating mechanism is often used, but it does not have sufficient power for some requirements. The applicant's U.S. Pat. No. 4,212,627 which issued Jul. 15, 1980 shows mechanical mechanism for driving several valve pins simultaneously between the open and closed positions. While this two position actuating mechanism is satisfactory for many applications, it cannot be used for applications such as multi-layer molding where it is necessary to drive the valve pins between three or four positions during each injection cycle. Canadian Application Serial Number 2,192,611 to Schramm et al. which was laid open Aug. 20, 1997 also shows previous mechanism for simultaneously driving the valve pins.

SUMMARY OF THE INVENTION

Accordingly, it is an object of the present invention to at least partially overcome the disadvantages of the prior art by providing improved valve gated multi-cavity injection molding apparatus having actuating mechanism to simultaneously accurately position all the valve pins between more than two different positions without requiring hydraulics in the mold.

To this end, in one of its aspects, the invention provides a multi-cavity injection molding apparatus having at least one melt distribution manifold and a plurality of heated nozzles mounted in a mold with an elongated valve pin reciprocating in a first direction in a central bore in each heated nozzle. A valve pin plate is mounted in the mold to reciprocate in a first direction. The valve pin plate has the valve pins extending forwardly therefrom and actuator means extending rearwardly therefrom. One or more elongated cam members are mounted in the mold adjacent the valve pin plate actuator means to reciprocate in a second direction lateral to the first direction. Either the valve pin plate actuator means or the elongated cam member has a plurality of diagonally extending grooves facing the other of the valve pin plate actuator means and the elongated cam member. The other of the valve pin plate actuator means and the elongated cam member has a number of laterally projecting slide means. Each of the laterally projecting slide means extends into one of the diagonally extending grooves, whereby movement of the elongated cam member in the second direction moves the valve pin plate actuator means, the valve pin plate and the attached valve pins in the first direction. The apparatus includes actuator mechanism to accurately drive the elongated cam member between at least first, second and third positions to accurately drive all the elongated valve pins simultaneously between first, second and third corresponding positions during each injection cycle.

Further objects and advantages of the invention will appear from the following description taken together with the accompanying drawings.

DETAILED DESCRIPTION OF THE INVENTION

Figure 1:
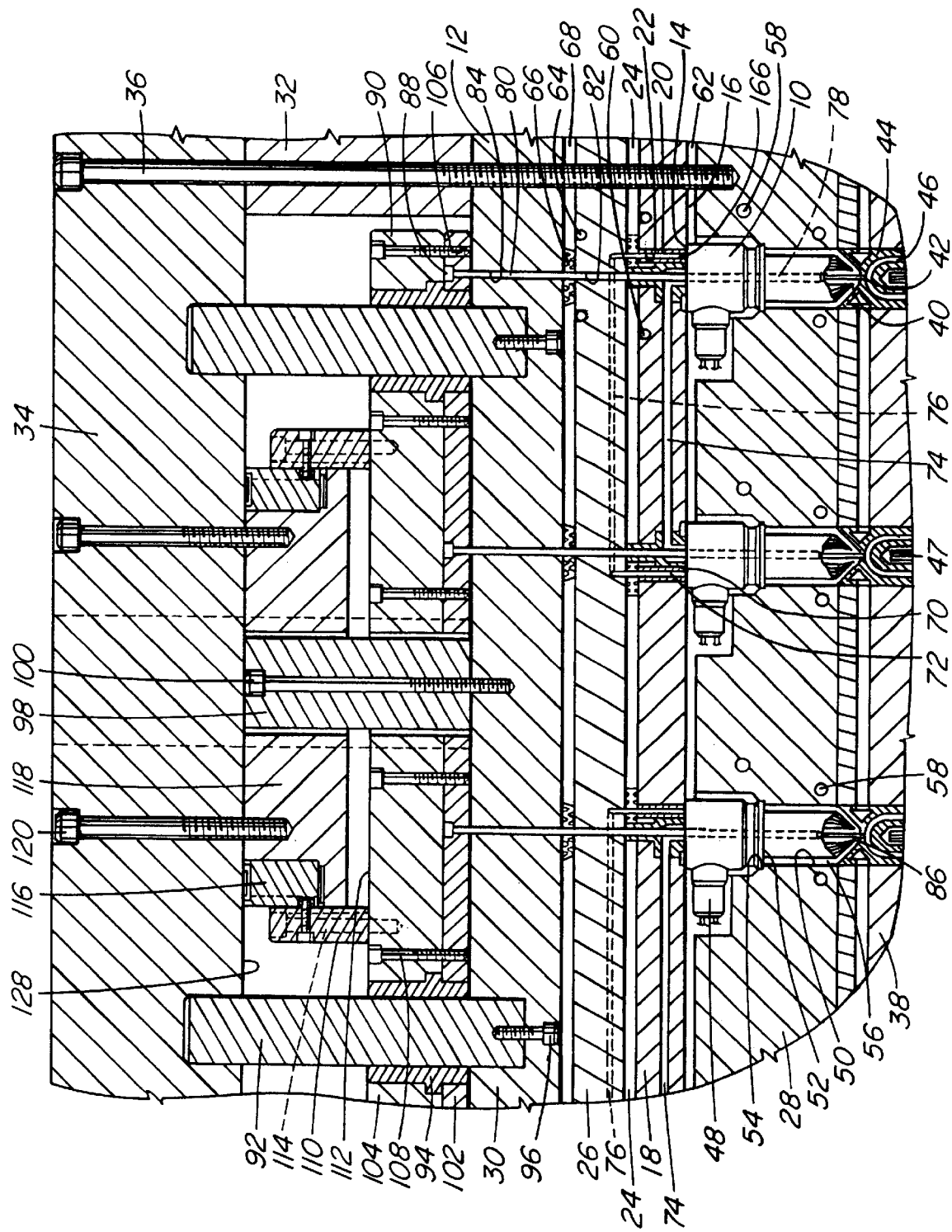
FIG. 1 is a sectional view of a portion of a multi-cavity injection molding system in the closed position having actuator mechanism according to the invention.
Figure 2:
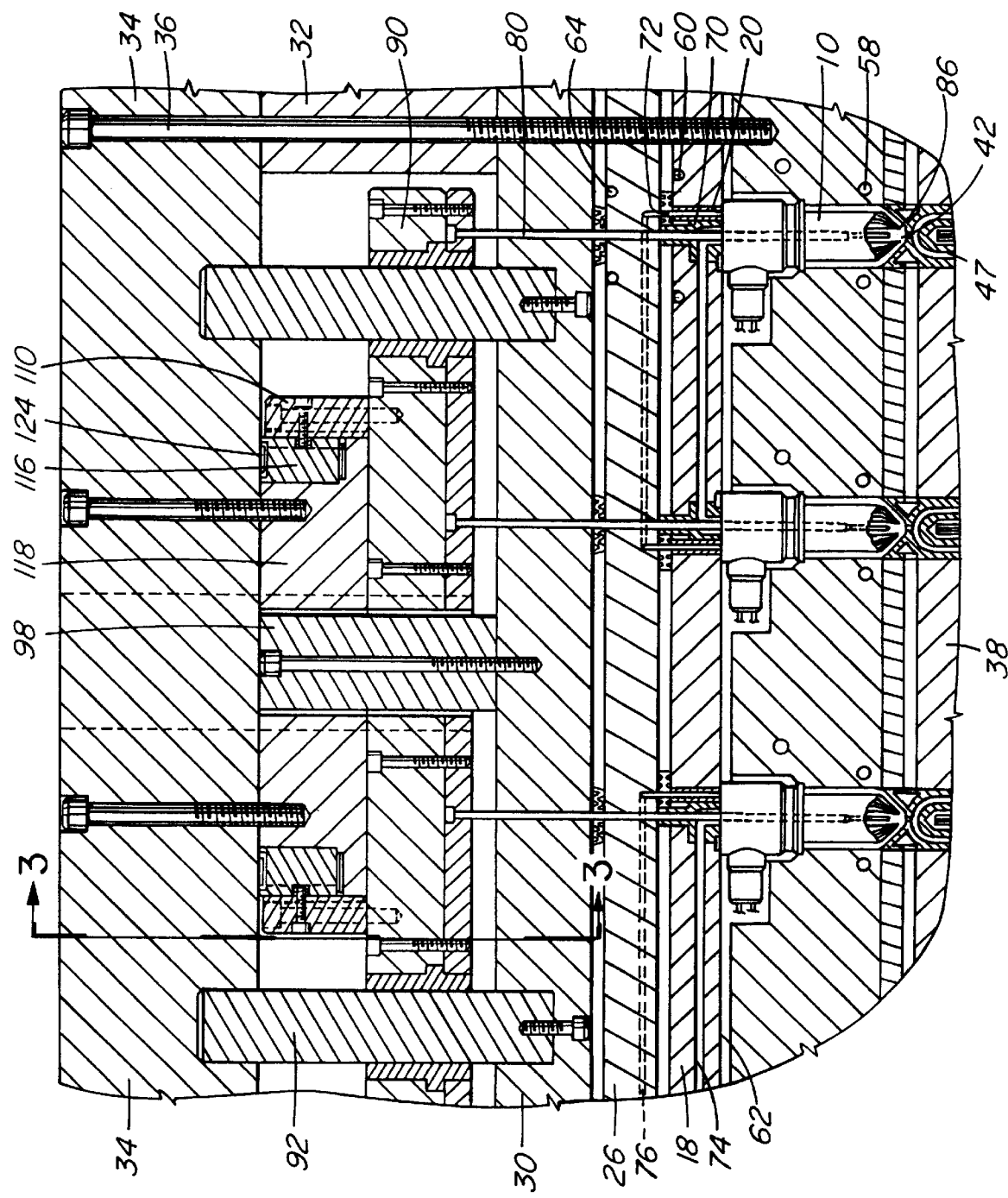
FIG. 2 is a similar view in the open position.

Reference is first made to FIGS. 1 and 2 which show a portion of a valve gated multi-cavity injection molding system or apparatus for molding five layer preforms or other products by a combination of sequential and simultaneous coinjection. Two layers of a barrier material such as ethylene vinyl alcohol copolymer (EVOH) or nylon are molded between two outer layers and a central layer of a polyethylene terephthalate (PET) type material. A number of heated nozzles 10 are mounted in a mold 12 with their rear ends 14 abutting against the front face 16 of a steel front melt distribution manifold 18. Thermal insulating melt transfer spacers 20 extending through openings 22 in the front melt distribution manifold 18 to provide an insulating air space 24 between the front melt distribution manifold 18 and a rear melt distribution manifold 26. While the mold 12 can have a greater number of plates depending upon the application, in this case only a nozzle retainer plate 28, a manifold retainer plate 30, a spacer plate 32 and a back plate 34 secured together by bolts 36, as well as a cavity retainer plate 38 are shown for ease of illustration. The front end 40 of each heated nozzle 10 is aligned with a gate 42 extending through a cooled gate insert 44 to a cavity 46. This cavity 46 for making beverage bottle preforms extends between a cavity insert (not shown) and a cooled mold core 47 in a conventional manner.

Each nozzle is heated by an integral electrical heating element having an electrical terminal 48. Each heated nozzle 10 is seated in an opening 50 in the nozzle retainer plate 28 with a rear collar portion 52 of the heated nozzle 10 received in a circular locating seat 54 extending around the opening 50. This provides an insulative air space 56 between the heated nozzle 10 and the surrounding mold 12 which is cooled by pumping cooling water through cooling conduits 58. The front melt distribution manifold 18 is heated by an integral electrical heating element 60 and is separated from the cooled nozzle retainer plate 28 by an insulative air space 62. The rear melt distribution manifold 26 is heated by an integral electrical heating element 64 to a different operating temperature than the front distribution manifold 18. The rear melt distribution manifold 26 is spaced by insulative spacers 66 from the manifold retainer plate 30 to provide an insulative air space 68 between them.

A melt dividing bushing 70 is seated in an opening 72 in the front melt distribution manifold 18 in alignment with each heated nozzle 10. A first melt passage 74 branches in the front melt distribution manifold 18 and divides in each melt dividing bushing 70 to extend from a common inlet (not shown) through each heated nozzle 10 to the aligned gate 42. A second melt passage 76 branches in the rear melt distribution manifold 26 to extend from a common inlet (not shown) through each melt transfer spacer 20 and each heated nozzle 10 to the aligned gate 42. The heated nozzles 10 each have inner and outer annular melt channels extending around a central melt channel 78 as shown in the applicants' Canadian Patent Application Serial Number 2,219,235 entitled "Five Layer Injection Molding Apparatus Having Four Position Valve Member Actuating Mechanism" filed Oct. 23, 1997.

Each heated nozzle 10 receives an elongated valve pin 80 extending through its central melt channel 78 in alignment with the gate 42. The valve pin 80 extends rearwardly through the aligned melt dividing bushing 70 and aligned bores 82 and 84 through the rear melt dividing manifold 26 and the manifold retainer plate 30. Each elongated valve pin 80 has a front end 86 which fits in the aligned gate 42 and a rear head 88 which is attached to a valve pin plate 90.

Leader pins 92 having bushings 94 are secured by screws 96 to extend between the manifold retainer plate 30 and the back plate 34. The valve pin plate 90 is mounted in the mold to reciprocate frontwardly and rearwardly on the leader pins 92. A support pillar 98 is secured by a screw 100 to the manifold retainer plate 30. The valve pin plate 90 has a front portion 102 and a rear portion 104. The valve pins 80 are inserted through holes 106 in the front portion 102, and the front and rear portions 102, 104 are then secured together by screws 108 to securely attach the valve pins 80 to the valve pin plate 90.

Figure 4:
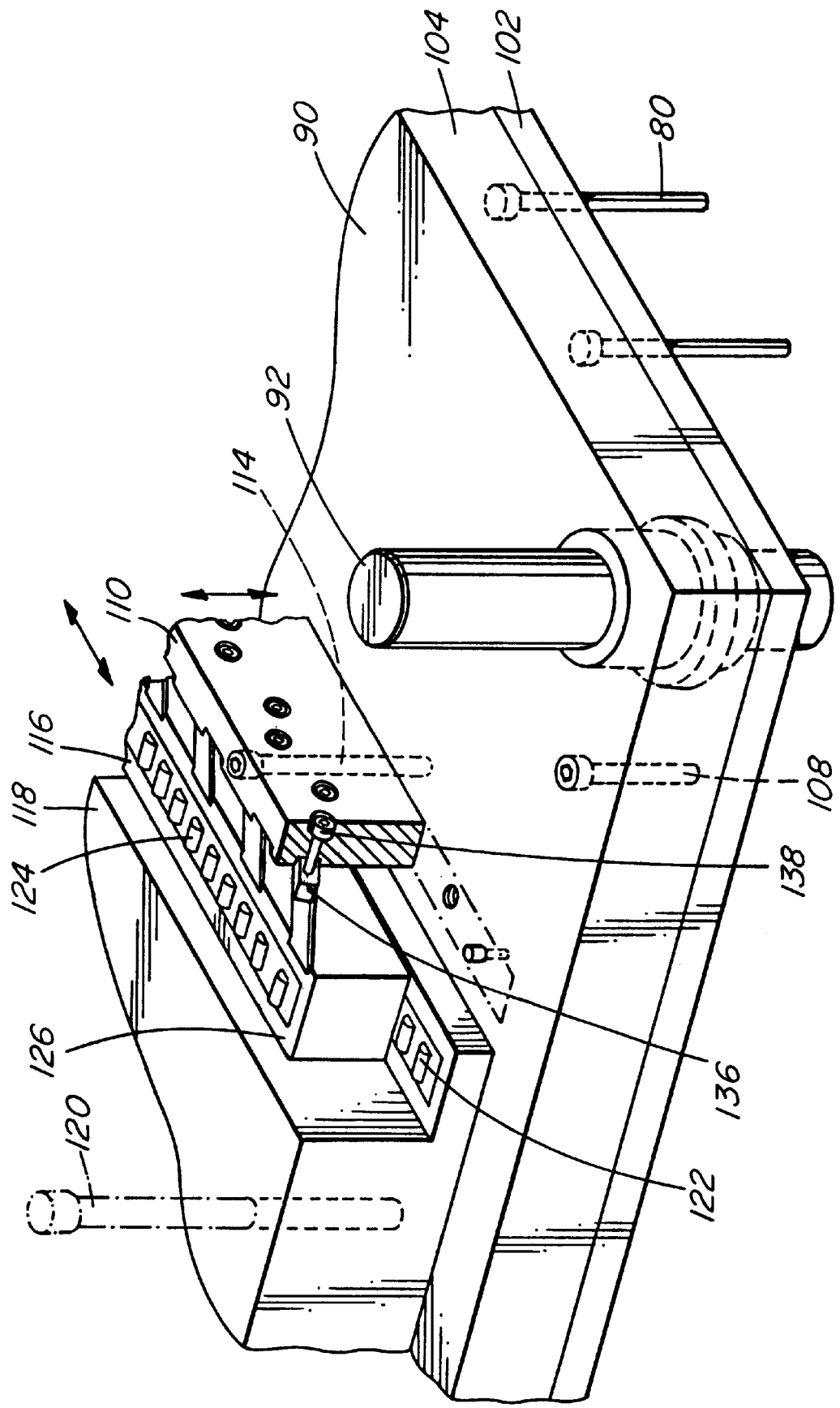
FIG. 4 is a cut-away isometric view showing a portion of the same actuator mechanism.

In this embodiment, the valve pin plate 90 has a pair of spaced elongated actuator bars 110 attached to its rear surface 112 by screws 114 to extend parallel to each other. As can be seen, a pair of elongated cam bars 116 extend between the pair of elongated actuator bars 110. These cam bars 116, which also extend parallel to each other, are mounted in a cam bar retainer plate 118 secured to the back plate 34 by bolts 120. As also seen in FIG. 4, each cam bar 116 is mounted to slide longitudinally on a series of linear roller bearings 122 mounted in the cam bar retainer plate 118. Another series of roller bearings 124 is mounted on its rear surface 126 which abuts against the front face 128 of the back plate 34.

Figure 5:
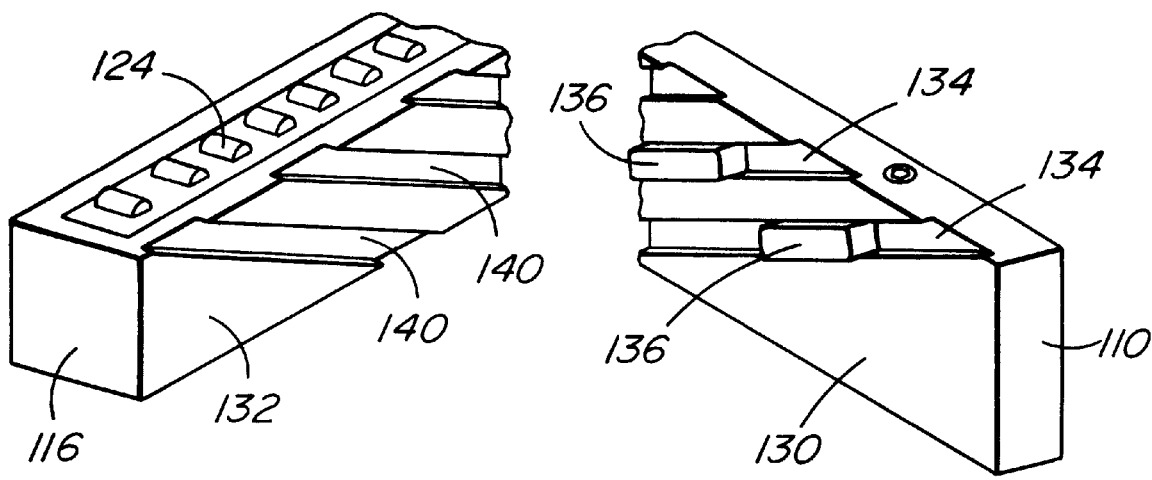
FIG. 5 is an isometric view clearly showing the diagonal grooves on the side surfaces of the elongated actuator and cam bars.

As best seen in FIGS. 4 and 5, each of the elongated actuator bars 110 attached to the valve pin plate 90 has a side surface 130 which faces a side surface 132 of the adjacent cam bar 116. The side surface 130 of each actuator bar 110 has a number of grooves 134 extending diagonally therein with rectangular slide blocks 136 seated in each diagonal groove 134. The slide blocks 136 are securely attached to the actuator bars 110 by bolts 138. The side surfaces 132 of the cam bars 116 also have grooves 140 which extend diagonally at the same angle as the grooves 134 in the actuator bars 110. The slide blocks 136 project outwardly from the side surface 130 of the actuator bar 110 and fit into the grooves 140 in the adjacent side surface 132 of the adjacent cam bar 116. The slide blocks 136 attached to each actuator bar 110 slide in the grooves 140 in the adjacent cam bar 116 which cannot move longitudinally. Thus, when the cam bars 116 are actuated back and forth longitudinally, the actuator bars 110 with the valve pin plate 90 and the valve pins 80 attached thereto are reciprocated forwardly and rearwardly. The actuator bars 110, cam bars 116, and slide blocks 136 are treated by a suitable process to be wear resistant. While the slide blocks 136 shown in this embodiment are attached to the actuator bars 110, in other embodiments they can be attached to the cam bars 116 to slide in the grooves 134 in the actuators bars 110.

Figure 3:
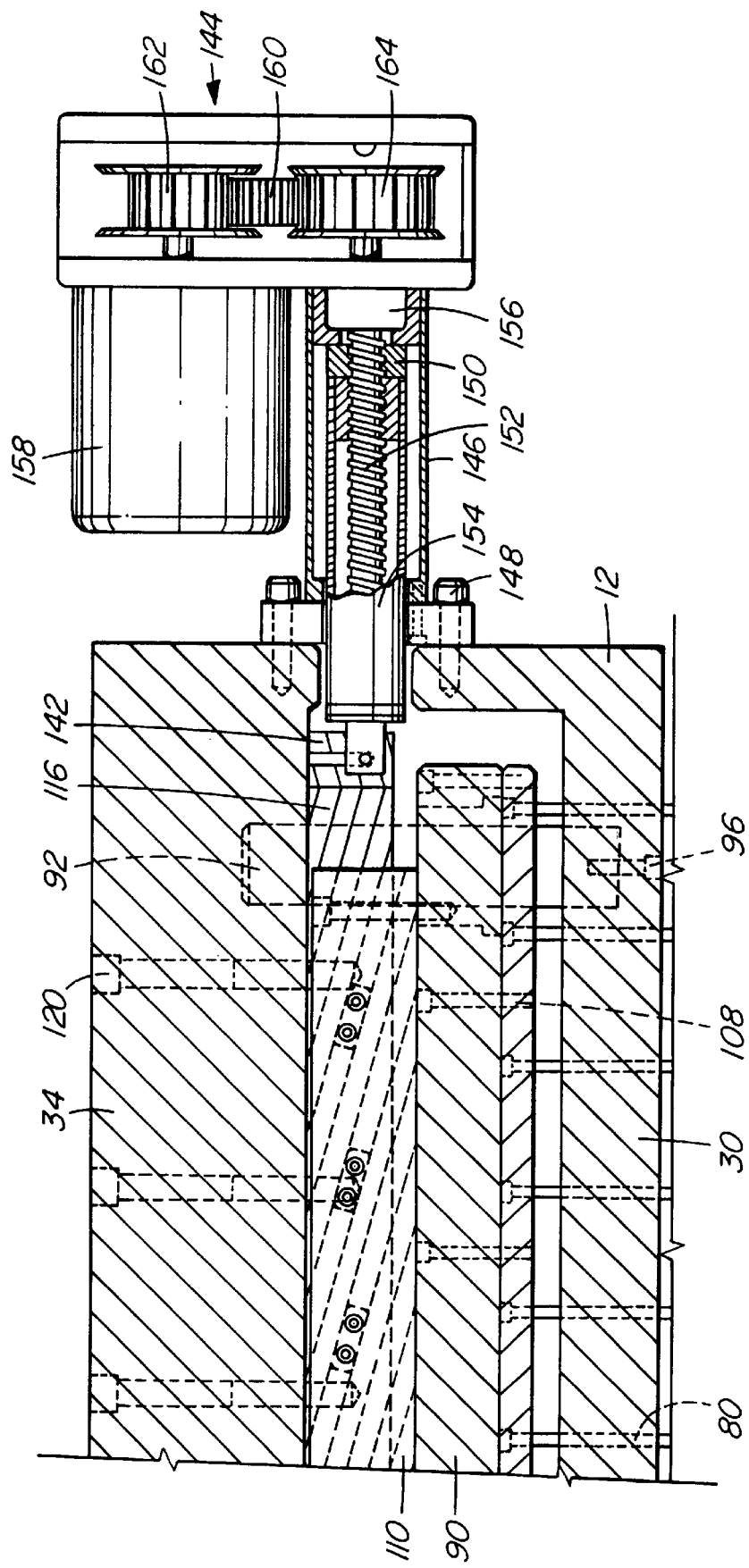
FIG. 3 is a partial sectional view taken along line 3—3 in FIG. 2 showing the actuating mechanism according to one embodiment of the invention.

Referring now to FIG. 3, the two cam bars 116 are both attached to a yoke member 142 which is driven by actuating mechanism 144 according to one embodiment of the invention having an outer casing 146 attached to the mold 12 by bolts 148. The actuating mechanism 144 includes a drive nut 150 which moves along a drive screw 152 as the screw is rotated. The drive nut 150 is attached to a cylindrical thrust transmitting tube 154 which is, in turn, attached to the yoke member 142. The drive screw 152 having a thrust bearing 156 is driven by a DC motor 158 through a drive belt 160 extending between pulleys 162, 164. In this embodiment, the actuating mechanism 144 is an electromechanical linear actuator model number made by Jasta-Dynact. The electric motor 158 is programmed to drive the cam bars 116 and thus all of the valve pins 80 simultaneously between four different positions during the injection cycle. In other embodiments, the electric motor 158 can be programmed to simultaneously drive the valve pins 80 between three or five different positions according to a different injection cycle.

In use, the injection molding system is assembled as shown in FIGS. 1 and 2 and operates to form five layer preforms or other products as follows. First, electrical power is applied to the heating element 60 in the front melt distribution manifold 18 and the heating elements in the heated nozzles 10 to heat them to the operating temperature of the plastic material to be injected through the central melt channel 78 in each heated nozzle 10. In a preferred embodiment, this material is a polyethylene terephthalate (PET) type material which has a melt temperature of about 565° F. Electrical power is also applied to the heating element 64 in the rear melt distribution manifold 26 to heat it to the operating temperature of the plastic material that is injected through the inner annular melt channel in each heated nozzle 10. This usually is a barrier material such as ethylene vinyl copolymer (EVOH) which has an operating temperature of about 400° F., but it can be a different material such as nylon. Water is supplied to the cooling conduits 58 to cool the mold 12 and the gate inserts 44. Hot pressurized melt is then injected from separate injection cylinders (not shown) into the first and second melt passages 74, 76 according to a predetermined injection cycle. The first melt passage 74 branches in the front melt distribution manifold 18 and extends to each melt dividing bushing 70 where it divides again and flows to the central melt channel 78 around the elongated valve pin member 80 as well as to the outer annular melt channel of the aligned heated nozzle 10. The second melt passage 76 branches in the rear melt distribution manifold 26 and extends through a central bore 166 in each melt transfer spacer 20 to the inner annular melt channel in each heated nozzle 10.

The flow of PET from the first melt passage 74 and the barrier material from the second melt passage 76 through each gate 42 into the cavity 46 is controlled by the actuating mechanism 144 reciprocating the elongated valve pins 80 between first, second, third and fourth positions during the injection cycle as follows. Initially, the valve pin plate 90 and the valve pins 80 attached thereto are in a first forward closed position shown in FIG. 1 wherein the front end 86 of each valve pin 80 is seated in the aligned gate 42. The program controlling the electric motor 158 according to the injection cycle then activates the electric motor 158 to draw the pair of cam bars 116 a precise distance to the right as seen in FIG. 3 and then stop. This causes the pair of actuator bars 110 to retract the valve pin plate 90 and the valve pins 80 attached thereto to a second partially open position. In this second position, each valve pin 80 is retracted sufficiently to allow PET to flow from the outer annual melt channel in each heated nozzle 10 through the gate 42 into the cavity 46 where part of it adheres to the sides of the cavity 46. After a predetermined initial quantity of PET has been injected into the cavities 46, the electric motor 158 is then again activated to draw the pair of cam bars 116 a precise distance further to the right and then stop. This further retracts the valve pins 80 simultaneously to a third further open position in which both PET from the outer annular melt channel and a barrier material from the inner annular melt channel are coinjected simultaneously through the gates 42 to the cavities 46. The flow of the less viscose barrier material splits the flow of PET into two outer layers.

After the simultaneous flow of PET and the barrier material has been established, the program again activates the electric motor 58 to draw the pair of cam bars 116 another precise distance further to the right. This retracts the valve pins 80 to the fourth fully open position. In this fully open position, the front ends 86 of the valve pins 80 are retracted sufficiently to also allow simultaneous flow of PET from the central melt channels 78 through the gates 42 into the cavities 46. This inner flow of PET, in turn, splits the flow of the barrier material into two layers on both sides of an inner layer of PET.

When the cavities 46 are almost filled, the program activates the electric motor 158 in the opposite direction to drive the pair of cam bars 116 a precise distance to the left as seen in FIG. 3 to return the valve pins 80 to the second position which stops the flow of PET from the central melt channel 78 and the flow of the barrier material from the inner annular melt channel. After another small quantity of PET has been injected to completely fill the cavities 46, the electric motor 158 is again activated to drive the pair of cam bars 116 another precise distance further to the left which advances the valve members 80 and returns them to the first closed position. After a short cooling period, the mold 12 is open for ejection. After ejection, the mold 12 is closed and the cycle is repeated continuously every 15 to 30 seconds with a frequency depending upon the wall thickness and the number and size of the cavities 46 and the exact materials being molded.

Reference is now made to FIGS. 6–9 which show a portion of a valve gated multi-cavity injection molding system or apparatus having actuating mechanism according to another embodiment of the invention. The elements of this embodiment which are the same as in the embodiment described above are described and illustrated using the same reference numerals. In this embodiment, the nozzles 10, the front and rear manifolds 18, 26, the actuator bars 110 and the cam bars 116 are the same as in the above embodiment and the description of them and their operation need not be repeated. However, in this embodiment the cam bars 116 are driven by a four position hydraulic actuating mechanism 168 rather than the electro-mechanical actuating mechanism 144 described above. In this embodiment, the hydraulic actuating mechanism 168 comprises a first piston 170 seated in a front cylinder 172, and a second ring piston 174 and a third piston 176 seated in a rear cylinder 178. The two cylinders 172, 178 extend in alignment and are formed by steel outer body parts 180 which are secured together by screws 182. The first piston 170 has a head portion 184 seated in the front cylinder 172 and a stem portion 186 extending forwardly out of the front cylinder 172 and connected by a pin 188 to the yoke member 142 extending between the two cam bars 116. The second ring piston 174 is seated in the rear cylinder 178. The third piston 176 has a head portion 190 seated in the rear cylinder 178 and a stem portion 192 extending forwardly through the second ring piston 174 and out of the rear cylinder 178 into the front cylinder 172 to abut against the head portion 184 of the first piston 170.

As can be seen, first and second hydraulic lines 194, 196 from a controlled source of hydraulic pressure (not shown) are connected to the front cylinder 172 on opposite sides of the first piston 170. A third hydraulic line 198 from the hydraulic pressure source is connected to the rear cylinder 178 in front of the second ring piston 174. A fourth hydraulic line 200 from the hydraulic pressure source is connected to the rear cylinder 178 between the second ring piston 174 and the third piston 176. A fifth hydraulic line 202 from the hydraulic pressure source is connected to the rear cylinder 178 behind the third piston 176. These hydraulic lines 194, 196, 198, 200, 202 extend from the source (not shown) which applies hydraulic pressure to the different lines according to a predetermined program controlled according to the injection cycle to reciprocate the valve pins 80 between first, second, third and fourth positions during the injection cycle as follows.

Figure 7:
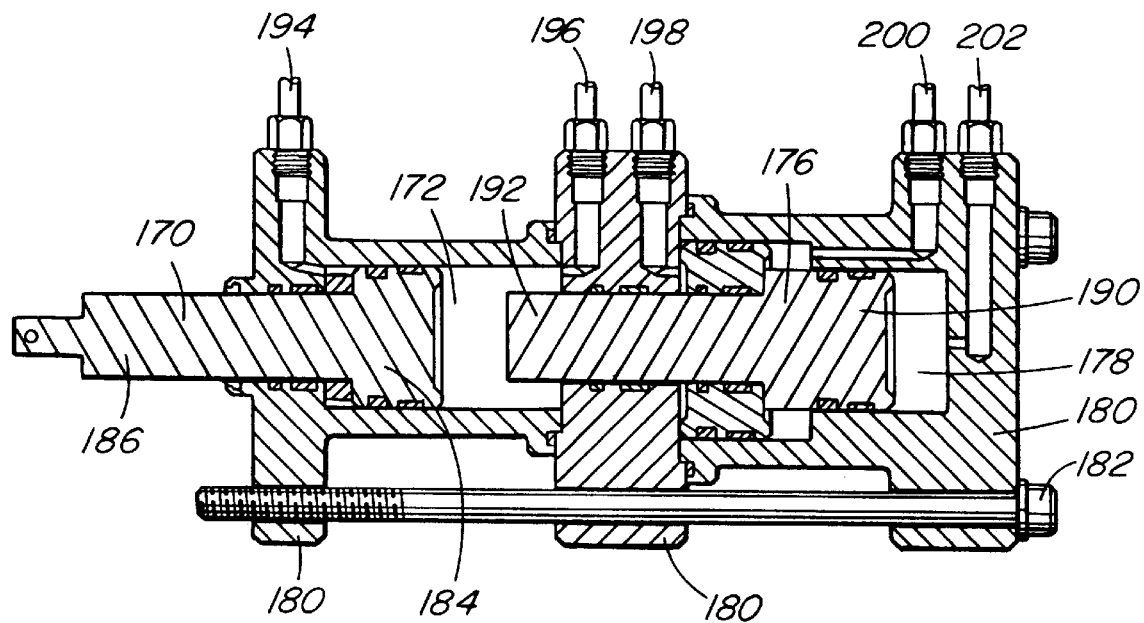
FIGS. 7, 8 and 9 are sectional views showing this hydraulic actuating mechanism seen in FIG. 6 in different positions.

Initially, hydraulic pressure is applied from the second hydraulic line 196 to the front cylinder 172 behind the first piston 170 and from the fifth hydraulic line 202 to the rear cylinder 178 behind the third piston 176 which drives both pistons 170, 176 forwardly to the position shown in FIG. 7. This, in turn, drives the valve pin plate 90 and the valve pins 80 attached thereto simultaneously to the first forward closed position shown in FIG. 1 wherein the front end 86 of each valve pin 80 is seated in the aligned gate 42. Next, the hydraulic pressure from the second hydraulic line 196 is released and hydraulic pressure is applied from the first hydraulic line 194 to the front cylinder 172 in front of the first piston 170 which drives the first piston 170 rearwardly to the position shown in FIG. 8. This simultaneously retracts the valve pins 80 to the second partially opened position. In this second partially opened position, each valve pin 80 is retracted sufficiently to allow PET to flow from the outer annular melt channel in each heated nozzle 10 through the aligned gate 42 into the aligned cavity 46 where part of it adheres to the sides of the cavity 46.

Figure 6:
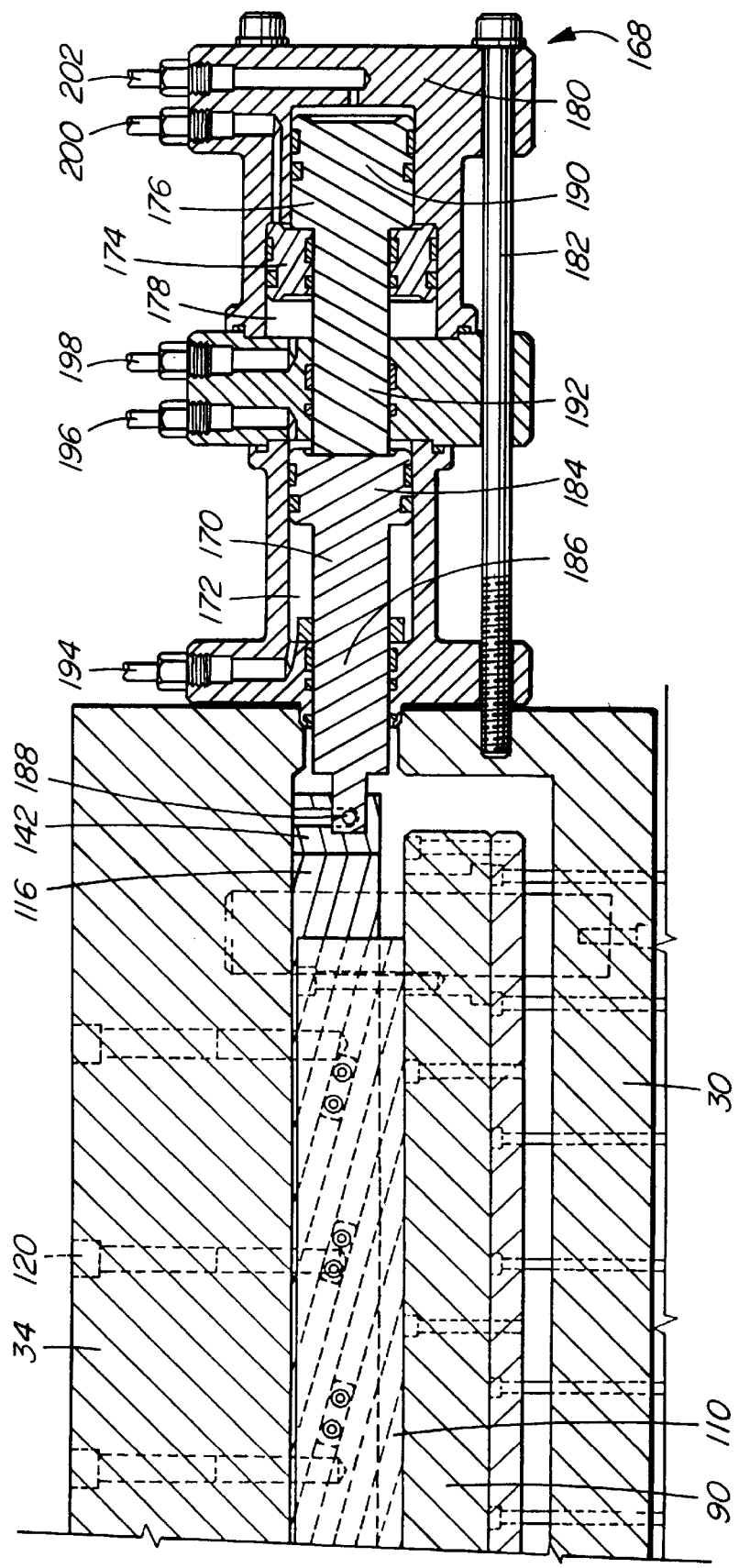
FIG. 6 is a partial sectional view similar to FIG. 3 showing the actuating mechanism according to another embodiment of the invention.

After a predetermined initial quantity of PET has been injected into the cavities 46, hydraulic pressure is applied from the third hydraulic line 198 to the rear cylinder 178 in front of the second ring piston 174 which drives the second ring piston 174 rearwardly which allows the first piston 170 to retract to the position shown in FIG. 6. This simultaneously retracts the valve pins 80 to a third further open position in which both PET from the outer melt channel and a barrier material from the inner annular melt channel are coinjected simultaneously through the gates 42 to the cavities 46. The flow of the less viscous barrier material splits the flow of PET into two outer layers.

Figure 9:
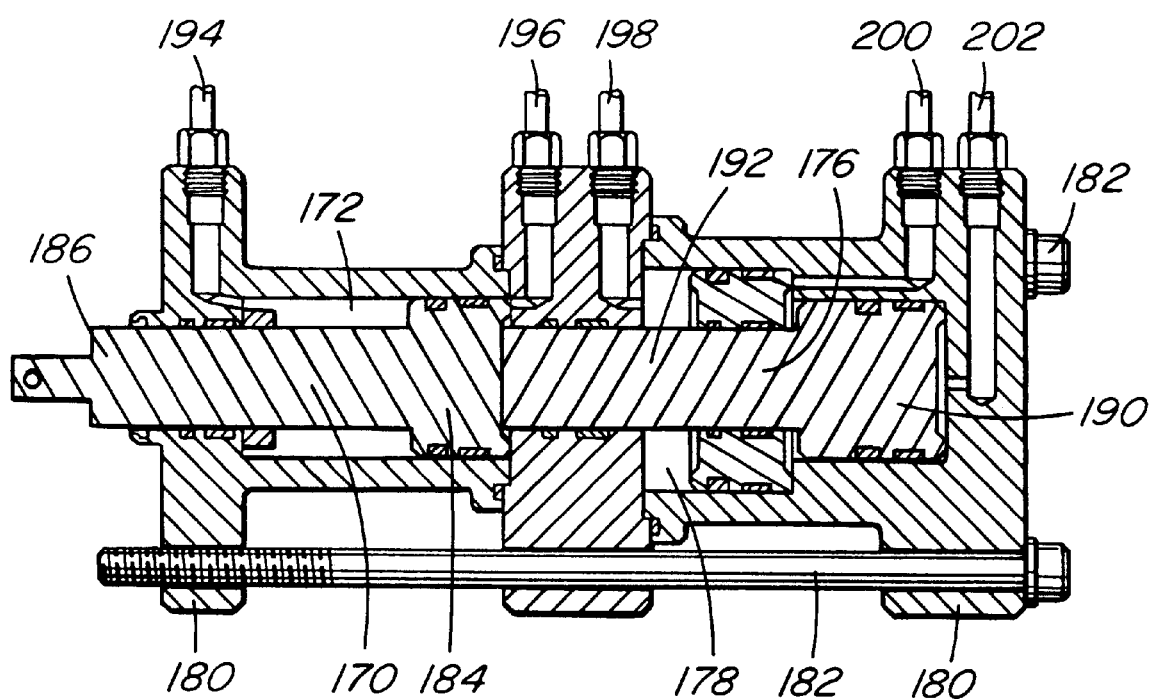

After the simultaneous flow of PET and a barrier material has been established, the hydraulic pressure from the third and fifth hydraulic lines 198, 202 is released which allows the pistons 170, 174, 176 to fully retract to the position shown in FIG. 9. This simultaneously further retracts the valve pins 80 to the fourth fully open position to also allow simultaneous flow of PET from the central melt channels 78 through the gates 42 into the cavities 46. This inner flow of PET, in turn, splits the flow of the barrier material into two layers on both sides of an inner layer of PET.

Figure 8:
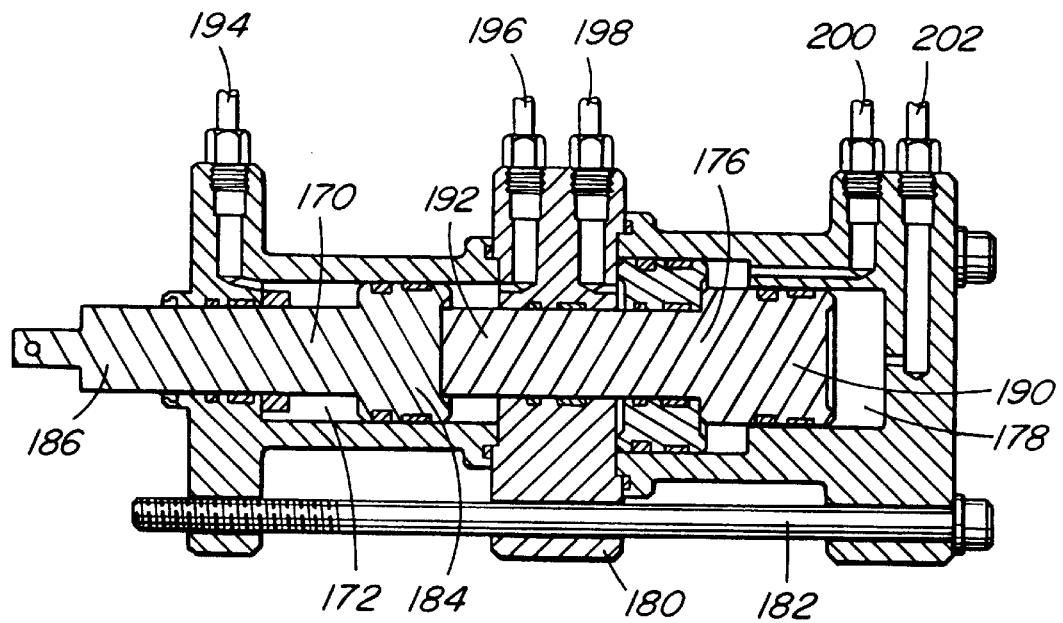

When the cavities 46 are almost filled, hydraulic pressure is reapplied from the fifth hydraulic line 202 to the rear cylinder 178 behind the third piston 176 which returns the pistons 170, 174, 176 to the position shown in FIG. 8. This simultaneously returns the valve pins 80 to the second partially open position which stops the flow of PET from the central melt channel 78 and the flow of the barrier material from the inner annular melt channel. After another small quantity of PET has been injected to completely fill the cavities 46, the hydraulic pressure is released from the first hydraulic line 194 and hydraulic pressure is reapplied from the second hydraulic line 196 to the front cylinder 172 behind the first piston 170 to drive the first piston to the position shown in FIG. 7. This returns the valve pins 80 to the first closed position. After a short cooling period, the mold 12 is open for ejection. After ejection, the mold 12 is closed and the cycle is repeated continuously every 15 to 30 seconds with a frequency depending upon the wall thickness and the number and size of the cavities 46 and the exact materials being molded.

Figure 10:
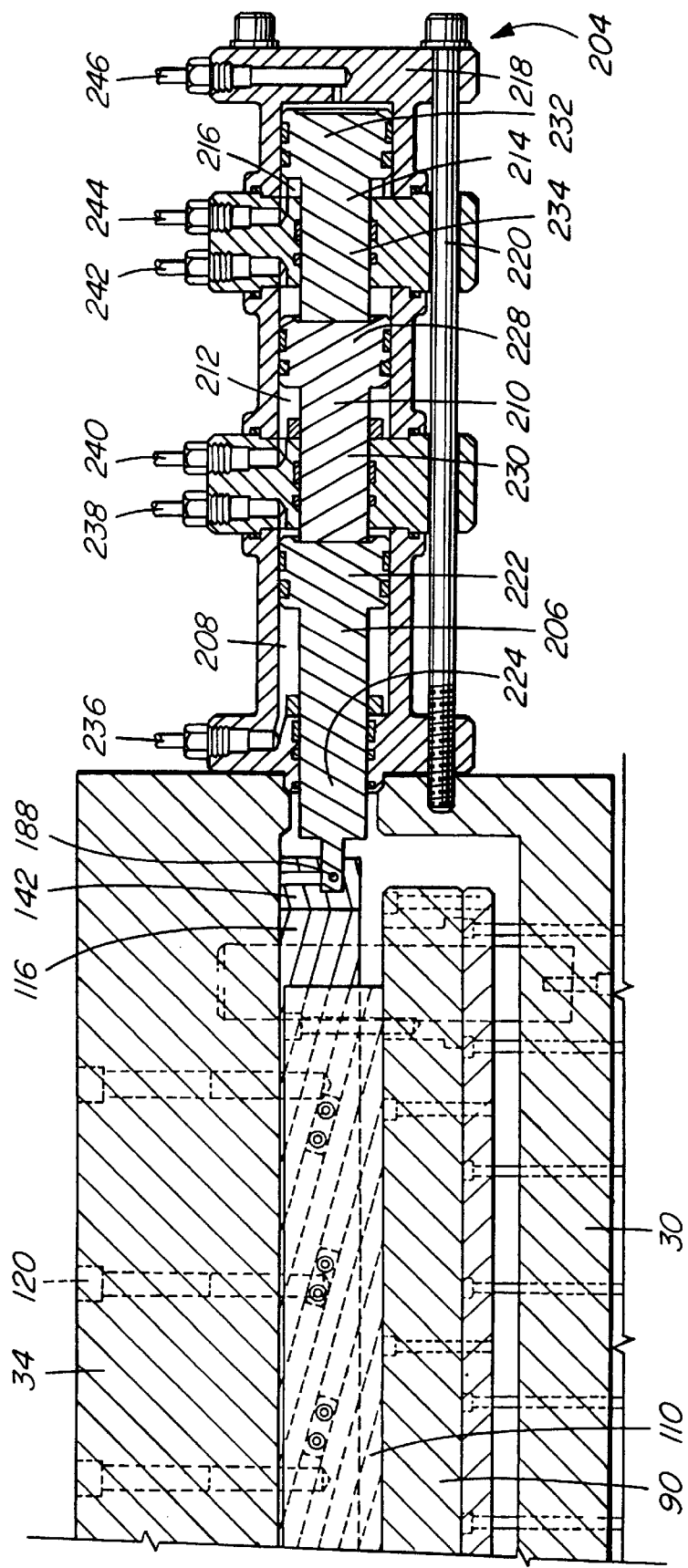
FIG. 10 is a partial sectional view similar to FIG. 3 showing the actuating mechanism according to a further embodiment of the invention.

Reference is now made to FIG. 10 which shows a portion of a valve gated multi-cavity injection molding system or apparatus having a different four position hydraulic actuating mechanism according to another embodiment of the invention. In this embodiment, the nozzles 10, the front and rear manifolds 18, 26, the actuator bars 110 and the cam bars 116 are the same as in the previous embodiment and their description need not be repeated. However, in this embodiment the hydraulic actuating mechanism 204 comprises a first piston 206 seated in a front cylinder 208, a second piston 210 seated in a middle cylinder 212, and a third piston 214 seated in a rear cylinder 216. The cylinders 208, 212, 216 extend in alignment and are formed by steel outer body parts 218 which are secured together by screws 220. The first piston 206 has a head portions 222 seated in the front cylinder 208 and a stem portion 224 extending forwardly out of the front cylinder 208 and connected by a pin 188 to the yoke member 142 extending between the two cam bars 116. The second piston 210 has a head portion 228 seated in the middle cylinder 212 with a stem portion 230 extending forwardly out of the middle cylinder 212 into the front cylinder 208 to abut against the head portion 222 of the first piston 206. The third piston 214 has a head portion 232 seated in the rear cylinder 216 and a stem portion 234 extending forwardly out of the rear cylinder 216 into the middle cylinder 212 to abut against the head portion 228 of the second piston 210.

As can be seen, first and second hydraulic lines 236, 238 are connected to the front cylinder 208 on opposite sides of the first piston 206. Third and fourth hydraulic lines 240, 242 are connected to the middle cylinder 212 on opposite sides of the second piston 210. Fifth and sixth hydraulic lines 244, 246 are connected to the rear cylinder 216 on opposite sides of the third piston 214. These hydraulic lines 236, 238, 240, 242, 244 and 246 extend from a source (not shown) which applies hydraulic pressure or exhaust back to a hydraulic tank to the different lines according to a predetermined program controlled according to the injection cycle to reciprocate the valve pins 80 between first, second, third and fourth positions during the injection cycle as follows.

In the forward closed position, hydraulic pressure is applied from the second, fourth and sixth hydraulic lines 238, 242, 246 to drive all of the pistons 206, 210, 214 forwardly. Then, hydraulic pressure from the second hydraulic line 238 is released and hydraulic pressure is applied from the first hydraulic line 236 to the front cylinder 208 in front of the first piston 206 which retracts the first piston 206 rearwardly to a second partially open position.

After a predetermined quantity of PET has been injected, the hydraulic pressure from the fourth hydraulic line 242 is released which allows the first and second pistons 206, 210 to retract to the third further open position. After the simultaneous flow of PET and the barrier material has been established, the hydraulic pressure from the sixth hydraulic line 246 is released which allows the pistons 206, 210, 214 to fully retract to the fully open position shown in FIG. 10.

When the cavities 46 are nearly filled, hydraulic pressure is reapplied from the fourth and sixth hydraulic lines 242, 246 to the middle and rear cylinders 212, 216 behind the second and third pistons 210, 214 which returns the pistons 206, 210, 214 to the second partially open position which stops the flow of PET from the central melt channel 78 and the flow of the barrier material from the inner annular melt channel. After another small quantity of PET has been injected to completely fill the cavities 46, the hydraulic pressure is released from a first hydraulic line 236 and hydraulic pressure is reapplied from the second hydraulic line 238 to the front cylinder 208 behind the first piston 206 to drive the first piston to the first closed position. After a short cooling period, the mold 12 is open for ejection. After ejection, the mold 12 is closed and the cycle is repeated continuously every 15 to 30 seconds with a frequency depending upon the wall thickness and the number and size of cavity 46 and the exact material being molded.

Figure 11:
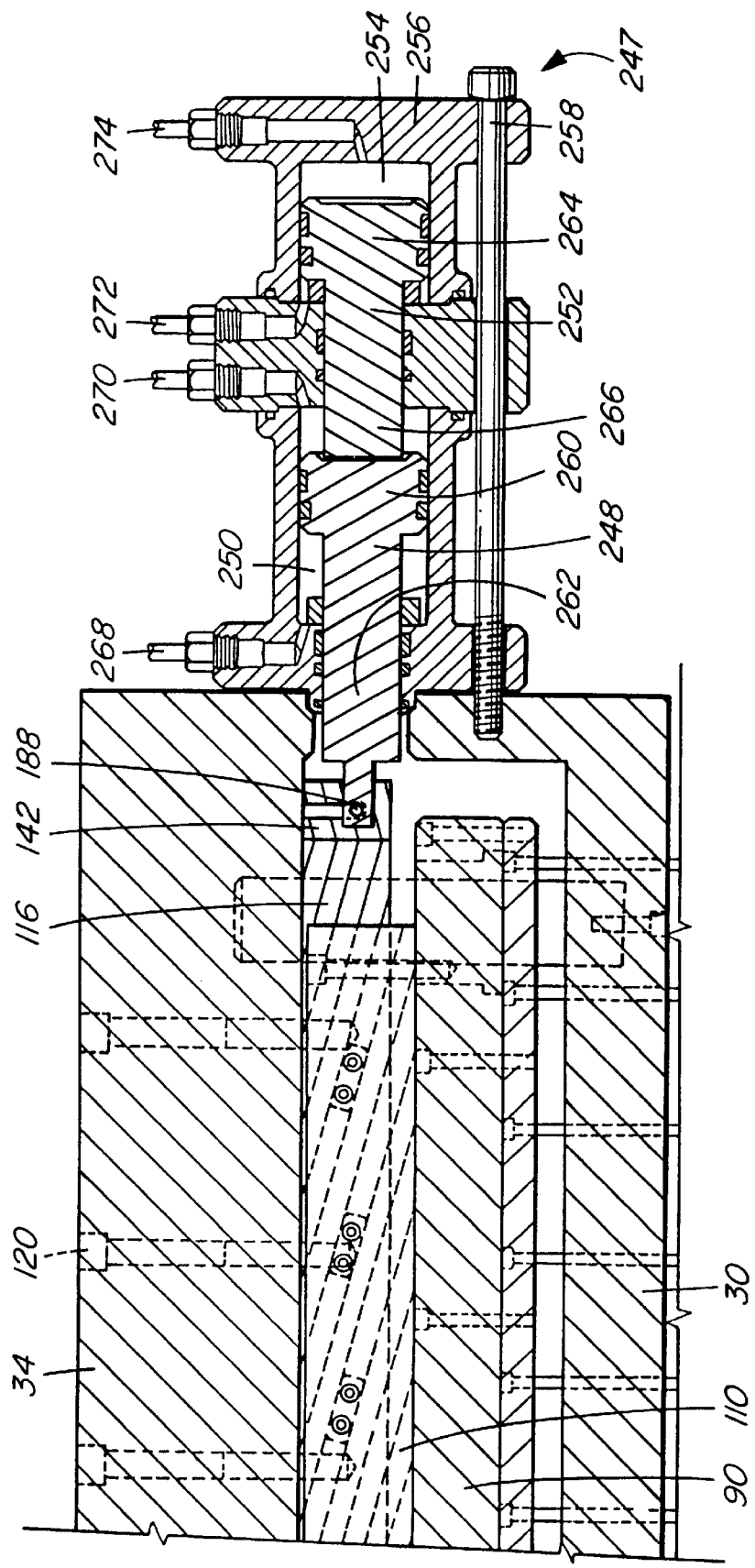
FIG. 11 is a partial sectional view similar to FIG. 3 showing the actuating mechanism according to yet another embodiment of the invention.
Figure 12:
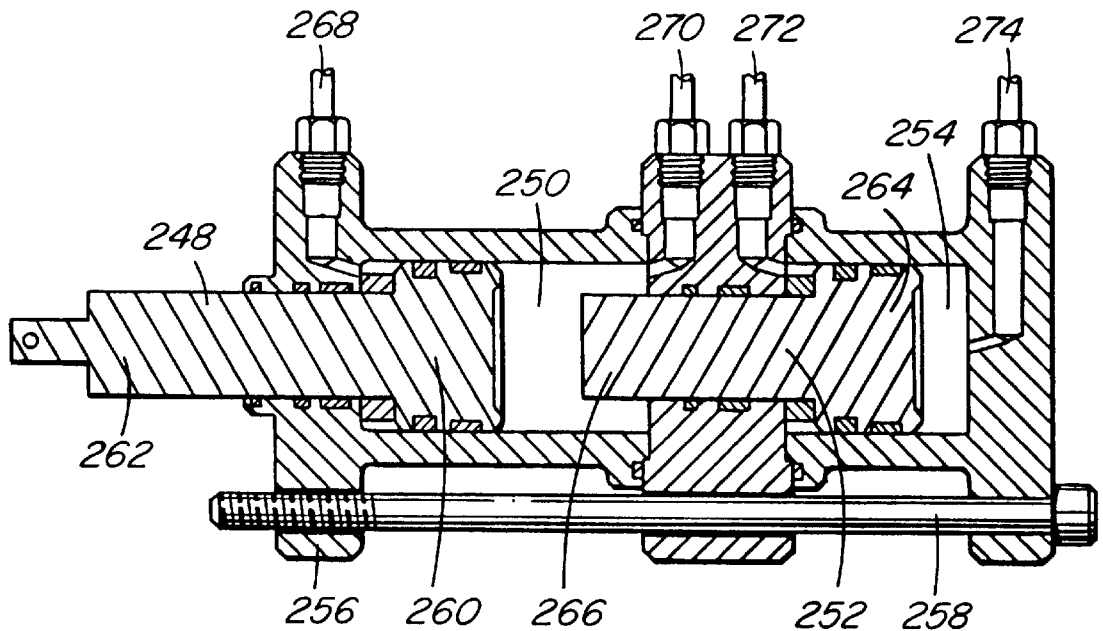
FIGS. 12 and 13 are sectional views showing the hydraulic actuating mechanism seen in FIG. 11 in different positions.
Figure 13:
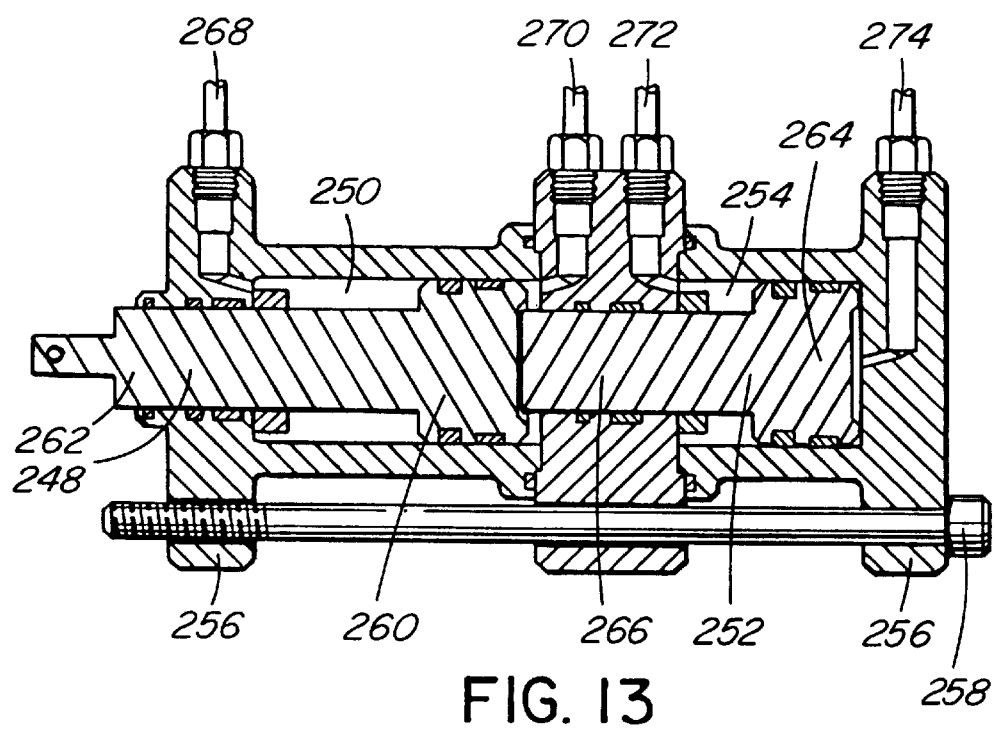

Reference is now made to FIGS. 11–13 which show a portion of a valve gated multi-cavity injection molding system or apparatus having a three position hydraulic actuating mechanism 247 according to a further embodiment of the invention. One layer of a barrier material such as ethylene vinyl alcohol copolymer (EVOH) or nylon is molded between two outer layers of a polyethylene terephthalate (PET) type material to make preforms or other layered products. In this embodiment, the actuator bars 110 and cam bars 116 are the same as in the previous embodiments and the nozzles 10 and the front and rear manifolds 18, 26 are similar except that the nozzles only have a single annular melt channel extending around the central melt channel 78 and the PET is supplied to the annular melt channels and the barrier material to the central melt channel 78. In this embodiment, the hydraulic actuating mechanism 247 comprises a first piston 248 seated in a front cylinder 250 and a second piston 252 seated in a rear cylinder 254. The cylinders 250, 254 extend in alignment and are formed by steel outer body parts 256 which are secured together by screws 258. The first piston 248 has a head portion 260 seated in the front cylinder 250 and a stem portion 262 extending forwardly out of the front cylinder 250 and connected by a pin 188 to the yoke member 142 extending between the two cam bars 116. The second piston 252 has a head portion 264 seated in the rear cylinder 254 with a stem portion 266 extending forwardly out of the rear cylinder 254 into the front cylinder 250 to abut against the head portion 260 of the front piston 248.

As can be seen, first and second hydraulic lines 268, 270 are connected to the front cylinder 250 on opposite sides of the first piston 248. Third and fourth hydraulic lines 272, 274 are connected to the rear cylinder 254 on opposite sides of the second piston 252. These hydraulic lines 268, 270, 272, 274 extend from a source (not shown) which applies hydraulic pressure to the different lines according to a predetermined program controlled according to the injection cycle to reciprocate the valve pins 80 between first, second and third positions during the injection cycle as follows.

In the forward closed position shown in FIG. 12, hydraulic pressure applied from the second hydraulic line 270 to the front cylinder 250 behind the first piston 248 and the fourth hydraulic line 274 to the rear cylinder 254 behind the second piston 252 slides the pistons 248, 252 forwardly. Then, hydraulic pressure from the second hydraulic line 270 is released and hydraulic pressure is applied from the first hydraulic line 268 to the front cylinder 250 in front of the first piston 248 which retracts the first piston 248 rearwardly to a second partially open position with its head portion 260 abutting against the stem portion 266 of the second piston 252 shown in FIG. 11. This simultaneously retracts the valve pins 80 to the partially open position in which PET is allowed to flow from the annular melt channel in each heated nozzle 10 through the aligned gate 42 into the aligned cavity 46 where part of it adheres to the sides of the cavity 46.

After a predetermined quantity of PET has been injected into the cavities 46, the hydraulic pressure from the fourth hydraulic line 274 is released and hydraulic pressure is applied from the third hydraulic line 272 to the rear cylinder 254 in front of the second piston 252 which retracts both pistons 248, 252 to the fully open position shown in FIG. 13. In this fully open position, each valve pin 80 is retracted sufficiently to allow simultaneous flow of PET from the annular melt channel and a barrier material from the central melt channel 78 in each nozzle 10 through the gates 42 into the cavities 46. The flow of the less viscous barrier material splits the flow of PET into two outer layers.

When the cavities 46 are almost filled, the hydraulic pressure from the third hydraulic line 272 is released and hydraulic pressure is reapplied from the fourth hydraulic line 274 to the rear cylinder 254 behind of the second piston 252 which returns the pistons 248, 252 to the second partially open position shown in FIG. 11. This stops the flow of the barrier material from a central melt channel 78. After another small quantity of PET has been injected to completely fill the cavities 46, the hydraulic pressure is released from the first hydraulic line 268 and hydraulic pressure is reapplied from the second hydraulic line 270 to the front cylinder 250 behind the first piston 248 to drive the first piston 248 to the first closed position shown in FIG. 12. After a short cooling period, the mold 12 is open for ejection. After ejection, the mold 12 is closed and the cycle is repeated continuously every 15 to 30 seconds with a frequency depending upon the wall thickness and the number and size of the cavities 46 and the exact materials being molded.

While the description of the valve gated injection molding apparatus having actuating mechanism to simultaneously accurately position the valve pins between a number of different positions has been given with respect to preferred embodiments, it will be evident that various modifications are possible without departing from the scope of the invention as understood by those skilled in the art and as defined in the following claims. For instance, in other embodiments, the pistons can be driven by pneumatic pressure rather than hydraulic pressure.

The embodiments of the invention in which an exclusive property or privilege is claimed is defined as follows:

1. In a multi-cavity injection molding apparatus having at least one melt distribution manifold and a plurality of heated nozzles mounted in a mold with an elongated valve pin reciprocating in a first direction in a central bore in each heated nozzle, a valve pin plate mounted in the mold to reciprocate in a first direction, the valve pin plate having the valve pins extending forwardly therefrom and actuator means extending rearwardly therefrom, at least one elongated cam member mounted in the mold adjacent the valve pin plate actuator means to reciprocate in a second direction lateral to the first direction, one of the valve pin plate actuator means and the at least one elongated cam member having a plurality of diagonally extending grooves facing the other of the valve pin plate actuator means and the at least one elongated cam member, the other of the valve pin plate actuator means and the at least one elongated cam member having a plurality of laterally projecting slide means, each of the laterally projecting slide means extending into one of the diagonally extending grooves, whereby movement of the at least one elongated cam member in the second direction moves the valve pin plate actuator means, the valve pin plate and the attached valve pins in the first direction, the improvement comprising;

actuating mechanism to drive the at least one elongated cam member between at least first, second and third positions in the second direction to drive all the elongated valve pins to stop simultaneously and accurately at least first, second and third corresponding positions the first direction during each injection cycle.

2. Injection molding apparatus as claimed in claim 1 wherein the at least one elongated cam member comprises a pair of parallel spaced cam bars and the valve pin plate actuator means comprises a pair of parallel spaced actuator bars attached to the valve pin plate, each of the cam bars extending adjacent one of the actuator bars.

3. Injection molding apparatus as claimed in claim 2 wherein the actuating mechanism accurately drives the pair of cam bars longitudinally between the at least first, second and third positions.

4. Injection molding apparatus as claimed in claim 3 wherein the laterally projecting slide means comprises a plurality of rectangular slide blocks attached to the other of the valve pin plate actuator means and the at least one elongated cam member, each of the slide blocks fitting into one of the diagonally extending grooves in said one of the valve pin plate actuator means and the at least one elongated cam member.

5. Injection molding apparatus as claimed in claim 4 wherein the actuating mechanism includes an electric motor controlled to drive the elongated valve pins between the at least first, second and third positions during each injection cycle.

6. Injection molding apparatus as claimed in claim 5 wherein the electric motor is controlled to drive the elongated valve pins between first, second, third and fourth positions during each injection cycle.

7. Injection molding apparatus as claimed in claim 6 wherein the electric motor is controlled to drive the elongated valve pins between first, second, third, fourth and fifth positions during each injection cycle.

8. Injection molding apparatus as claimed in claim 4 wherein the actuating mechanism includes a plurality of pistons in cylinders controlled to drive the elongated valve pins between the at least first, second and third positions during each injection cycle.

9. Injection molding apparatus as claimed in claim 5 wherein the actuating mechanism includes aligned front and rear cylinders, a first piston, a second ring piston, and a third piston, the first piston having a head portion seated in the front cylinder and a stem portion extending forwardly from the front cylinder and connected to the at least one elongated cam member, the second ring piston being seated in the rear cylinder, and the third piston having a head portion seated in the rear cylinder and a stem portion extending forwardly through the second ring piston and out of the rear cylinder into the front cylinder to abut against the head portion of the first piston, first and second fluid lines from fluid pressure means connected to the front cylinder on opposite sides of the first piston, a third fluid line from fluid pressure means connected to the rear cylinder in front of the second ring piston, a fourth fluid line from fluid pressure means connected to the rear cylinder between the second ring piston and third piston, and a fifth fluid line from fluid pressure means connected to the rear cylinder behind the third piston, whereby applying fluid pressure through the first, second, third, fourth and fifth fluid pressure lines according to a predetermined cycle reciprocates the elongated valve pins between the first, second and third positions and a fourth position according to a continuous predetermined injection cycle.

10. Injection molding apparatus as claimed in claim 5 wherein the actuating mechanism includes aligned front, middle and rear cylinders, a first piston, a second piston, and a third piston, the first piston having a head portion seated in the front cylinder and a stem portion extending forwardly from the front cylinder and connected to the at least one elongated cam member, the second piston having a head portion seated in the middle cylinder and a stem portion extending forwardly out of the middle cylinder into the front cylinder to abut against the head portion of the first piston, the third piston having a head portion seated in the rear cylinder and a stem portion extending forwardly out of the rear cylinder into the middle cylinder to abut against the head portion of the second piston, first and second fluid lines from fluid pressure means connected to the front cylinder on opposite sides of the first piston, third and fourth fluid lines from fluid pressure means connected to the middle cylinder on opposite sides of the second piston, and fifth and sixth fluid lines from fluid pressure means connected to the rear cylinder on opposite sides of the third piston, whereby applying fluid pressure through the first, second, third, fourth, fifth and sixth fluid pressure lines according to a predetermined cycle reciprocates the elongated valve pins between the first, second and third positions and a fourth position according to a continuous predetermined injection cycle.

11. Injection molding apparatus as claimed in claim 5 wherein the actuating mechanism includes aligned front and rear cylinders, a first piston, and a second piston, the first piston having a head portion seated in the front cylinder and a stem portion extending forwardly from the front cylinder and connected to the at least one elongated cam member, the second piston having a head portion seated in the rear cylinder and a stem portion extending forwardly out of the rear cylinder into the front cylinder to abut against the head portion of the first piston, first and second fluid lines from fluid pressure means connected to the front cylinder on opposite sides of the first piston, third and fourth fluid lines from fluid pressure means connected to the rear cylinder on opposite sides of the second piston, whereby applying fluid pressure through the first, second, third and fourth fluid pressure lines according to a predetermined cycle reciprocates the elongated valve pins between the first, second and third positions according to a continuous predetermined injection cycle.

* * * * *